(12) United States Patent
Watanabe et al.

(10) Patent No.: US 6,726,508 B2
(45) Date of Patent: Apr. 27, 2004

(54) CARD CONNECTOR

(75) Inventors: Yoshinori Watanabe, Tokyo (JP); Hidenori Muramatsu, Kanagawa (JP); Katsumi Yamaguchi, Saitama (JP)

(73) Assignee: Tyco Electronics AMP K.K., Kawasaki (JP)

( * ) Notice: Subject to any disclaimer, the term of this patent is extended or adjusted under 35 U.S.C. 154(b) by 0 days.

(21) Appl. No.: 10/327,460

(22) Filed: Dec. 20, 2002

(65) Prior Publication Data

US 2003/0119365 A1 Jun. 26, 2003

(30) Foreign Application Priority Data

Dec. 21, 2001 (JP) .......................................... 2001-390203

(51) Int. Cl.⁷ .............................................. H01R 13/64
(52) U.S. Cl. ...................................... 439/677; 439/630
(58) Field of Search ................................. 439/677, 680, 439/630, 138; 235/441

(56) References Cited

U.S. PATENT DOCUMENTS

| | | | | |
|---|---|---|---|---|
| 5,036,430 A | * | 7/1991 | Hills ............................ | 439/677 |
| 5,225,653 A | | 7/1993 | Martin et al. ................ | 235/441 |
| 6,089,919 A | * | 7/2000 | Nishioka ..................... | 439/630 |
| 6,511,350 B1 | * | 1/2003 | Ito et al. ..................... | 439/677 |

FOREIGN PATENT DOCUMENTS

| | | | |
|---|---|---|---|
| FR | 2687238 | 2/1992 | ............ G06K/7/06 |
| JP | 02035584 | 2/1990 | ........... G06K/17/00 |
| JP | 02035584 A | 2/1999 | |
| JP | 11039435 A | 2/1999 | |
| JP | 11039435 | 2/1999 | ........... G06K/13/06 |
| JP | 2001134719 A | 5/2001 | |

* cited by examiner

*Primary Examiner*—Gary Paumen
(74) *Attorney, Agent, or Firm*—Barley Snyder (57) ABSTRACT

A card connector defining one card-accommodating slot adapted to accommodate a thin card, such as a smart card, and another card-accommodating slot adapted to accommodate a thick card, such as an IC card. The insertion of thin cards completely into the card-accommodating slot which accommodates thick cards is prevented by a member which pivots into the thick card-accommodating slot. The member includes a cam surface adapted to be contacted by a thick card upon insertion into the thick card-accommodating slot and a groove adapted to accommodate a thin card upon insertion into the thick card-accommodating slot. The member is pivotally mounted by a shaft to a card guiding arm defining the thick card-accommodating slot.

23 Claims, 7 Drawing Sheets

*Prior Art*

FIG. 8 (B)

*Prior Art*

FIG. 9 (A)

*Prior Art*

FIG. 9 (B)

*Prior Art*

CARD CONNECTOR

FIELD OF THE INVENTION

The present invention relates to a card connector which has at least two card-accommodating slots, one of which accommodates a thin card such as an ISO standard IC card (also known as a "smart card") and another of which accommodates a thick card such as a PCMCIA standard IC card.

BACKGROUND OF THE INVENTION

In recent years, the use of personal computers has grown rapidly as a result of progress made in computer technology. In particular, in the field of notebook personal computers, compact computers with high performance have been developed and computers equipped with card connectors which have two card-accommodating slots have also been developed. One card-accommodating slot accommodates an ISO standard IC card (hereinafter referred to as a "smart card") and the other card-accommodating slot accommodates a PCMCIA standard IC card (hereinafter referred to as an "IC card").

With respect to smart cards, as shown in FIGS. 6(A) and 6(B), a smart card 100 comprises a plurality of terminal parts 101 on one main surface of the card 100. With respect to the dimensions of the card 100, the card 100 typically has a depth of about 85.6 mm, a width of about 54 mm, and a thickness of from about 0.68 mm to about 0.84 mm.

Figure 7:
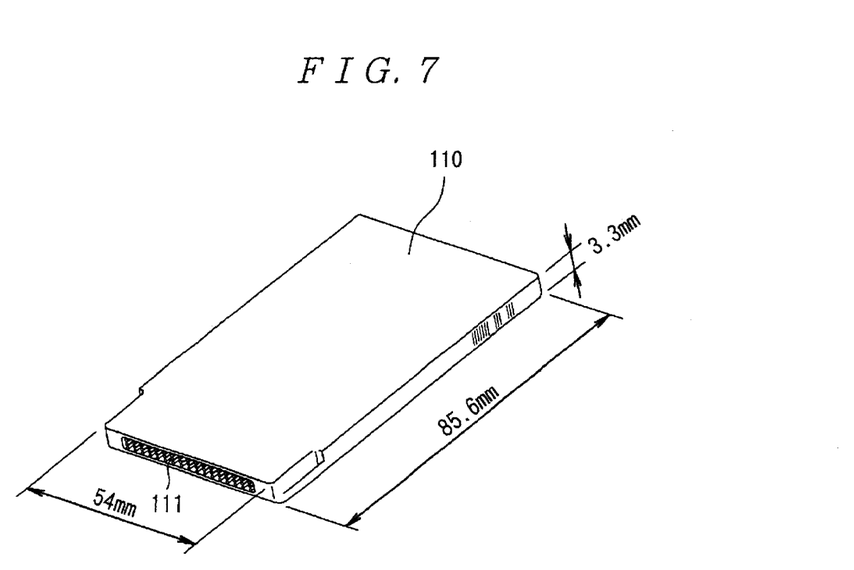
FIG. 7 is a perspective view showing a PCMCIA standard type-I IC card.

With respect to IC cards, there are three types of IC cards, i.e., type I used as a semiconductor memory card, type II used as a modem card, and type III used as a hard disk card. FIG. 7 shows a type-I IC card 110 which comprises a connector 111 on one end portion of the card 110. With respect to the dimensions of the card 100, the depth is about 85.6 mm, the width is about 54 mm, and the thickness is about 3.3 mm. The type-II and type-III IC cards are not shown but, like the type-I IC card shown in FIG. 7, these cards have a depth of about 85.6 mm and a width of about 54 mm. The main difference between the type II and type-III IC cards in comparison to the type-I IC cards is that they have thickness of about 5 mm and about 10.5 mm, respectively.

When the dimensions of the smart cards 100 and the dimensions of the IC cards 110 are compared, it is noted that the depth and width are the same, and that only the thickness of the cards is different, with the smart cards 100 being thinner than the PCMCIA standard IC cards.

Since the smart cards 100 are thinner than the PCMCIA standard IC cards, the height of the card-accommodating slot that accommodates smart cards 100 in the above-mentioned prior art card connector is relatively small, while the height of the card-accommodating slot that accommodates IC cards is relatively large. As such, in normal use, smart cards are inserted into the card-accommodating slot that has a relatively small height, and IC cards are inserted into the card-accommodating slot that has a relatively large height.

In such prior art card connectors that accommodate two types of cards with different thicknesses, it is not possible to insert thick cards (IC cards) into the card-accommodating slots used for cards with a small height (the smart card card-accommodating slot). On the other hand, thin cards (smart cards) may be inserted into the card-accommodating slot used for cards with a large height (the IC card card-accommodating slot).

If a thin card is inserted into the card-accommodating slot used for cards with a large height, e.g., if a smart card 100 is inserted into the card-accommodating slot used for PCMCIA standard IC cards 110, there is a danger that the plurality of pin contacts corresponding to the card-accommodating slot used for IC cards 110, or a portion of the housing, etc., may be bent and damaged by the end portion of the smart card 100. Furthermore, if a smart card 100 is inserted into the above-mentioned card-accommodating slot, even if the pin contacts are not damaged, the end user may mistakenly believe that the above-mentioned smart card 100 has been inserted into the appropriate card-accommodating slot, and the notebook personal computer will not operate normally when the power supply is switched on.

To prevent the insertion of thin smart cards into card-accommodating slots designed for thicker IC cards, several devices have been developed.

Figure 8:
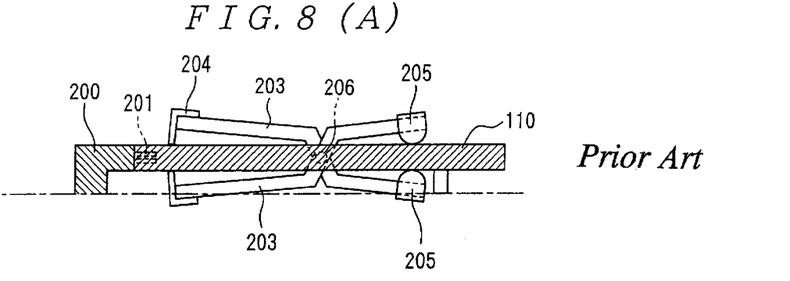
FIG. 8(A) is a sectional view of a prior art IC card socket illustrating the operation when a thick IC card is inserted.
FIG. 8(B) is a sectional view of the prior art IC card socket shown in FIG. 8(A) illustrating the operation when a thin smart card is inserted.

For example, FIGS. 8(A) and 8(B) show an IC card socket which prevents the insertion of thin cards into a card-accommodating slot used for thicker IC cards (for additional details of this socket, reference is made to Japanese Patent Application Kokai No. H11-39435).

As shown in FIGS. 8(A) and 8(B), the IC card socket 200 comprises a plurality of pin contacts 201 electrically connected with the IC card 100 when the IC cards is inserted into the socket 200, and a pair of guide rails 202 that guide the insertion of the IC card 100 into engagement with the pin contacts 201. A set of upper and lower thickness detection levers 203 are arranged on one of the guide rails 202 and are supported by a pivoting shaft 206 so that the levers 203 can pivot. Clamping parts 205 are arranged on the end portions of the detection levers 203 on the side of the card insertion opening and detect the thickness of inserted objects that are inserted into the guide rails 202. Shutter parts 204 are arranged on the end portions of the thickness detection levers 203 on the side of the pin contacts.

When a thick IC card 110 is inserted into the IC card socket 200 along the guide rails 202, the clamping parts 205 open, and the upper and lower thickness detection levers 203 open about the pivoting shaft 206 as shown in FIG. 8(A). Furthermore, at the same time that the thickness detection levers 203 open, the shutter parts 204 open, and the IC card 110 can be connected to the pin contacts 201.

On the other hand, when a thin smart card 100 is inserted along the guide rails 202, since the thickness of the smart card 100 is smaller than the thickness of the IC card 110, the upper and lower detection levers 203 do not open, as shown in FIG. 8(B). Accordingly, the shutter parts 204 remain closed so that the insertion of the smart card 100 is prevented by the shutter parts 204.

There are several problems with the IC card socket 200 shown in FIGS. 8(A) and 8(B). For example, although the IC card socket 200 is usually effective when there is one card-accommodating slot that accommodates IC cards, it cannot be used in card connectors in which at least two card-accommodating slots are arranged adjacent one another in a vertical configuration, one card-accommodating slot being designed to accommodate a thin card and the other being designed to accommodate a thick card. Furthermore, the mechanism that prevents the insertion of thin cards is complicated, the manufacturing cost of the IC card socket 200 is high and the socket is bulky.

Figure 9:
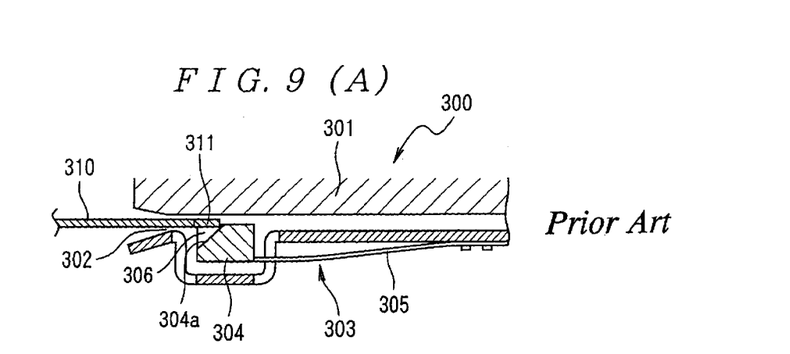
FIG. 9(A) is a sectional view of a prior art IC cartridge reader illustrating the operation when an appropriate IC cartridge is inserted.
FIG. 9(B) is a sectional view of the prior art IC cartridge reader illustrating the operation when an inappropriate IC cartridge is inserted.

Another device for preventing insertion of thin smart cards into card-accommodating slots designed for thicker IC cards is shown in FIGS. 9(A) and 9(B) and is known as an IC cartridge reader. The IC cartridge reader has a mechanism for preventing the erroneous insertion of inappropriate IC cartridges and is more fully described in Japanese Patent Application Kokai No. H2-35584.

As shown in FIGS. 9(A) and 9(B), the IC cartridge reader 300 comprises a chassis 301 defining an IC cartridge insertion opening 302. A shutter mechanism 303 is arranged inside the chassis 301 in the vicinity of the IC cartridge insertion opening 302. The shutter mechanism 303 includes a shutter main body 304 and a spring member 305 which supports the shutter main body 304 so that the shutter main body 304 can open and close. An erroneous-insertion preventing projection 306 is formed on the shutter main body 304, and a cut-out 311 is formed in the end portion of the IC cartridge 310 in a position corresponding to the erroneous insertion preventing projection 306.

As shown in FIG. 9(A), when an appropriate IC cartridge 310 is inserted in the normal manner into the IC cartridge insertion opening 302, the erroneous-insertion preventing projection 306 is inserted into the interior of the cut-out 311 so that the tip end of the IC cartridge 310 contacts the shutter main body 304. Since an inclined surface 304a is formed on the shutter main body 304, a downward-oriented component force of the insertion force of the IC cartridge 310 is generated by the inclined surface 304a so that the shutter main body 304 is driven downward against the elasticity of the spring member 305. As a result, the IC cartridge 310 can be inserted.

On the other hand, when an inappropriate IC cartridge, e.g., an IC cartridge 310 that does not have a cut-out 311, or an IC cartridge 310 in which the position of the cut-out 311 is different, is inserted into the IC cartridge insertion opening 302, the tip end of the IC cartridge 310 contacts the erroneous-insertion preventing projection 306 as shown in FIG. 9(B). Since the erroneous insertion preventing projection 306 is formed perpendicular to the direction of insertion of the IC cartridge 310, a downward-oriented component force is not generated in the shutter main body 304 so that the shutter main body 304 is not opened. As a result, the insertion of the inappropriate IC cartridge 310 is prevented.

One disadvantage of the IC cartridge reader 300 shown in FIGS. 9(A) and 9(B) is that the IC cartridge 310 for use in the IC cartridge reader 300 must be a unique cartridge having a cutout 311 formed in the end portion. As such, the cartridge reader 300 cannot be used with general all-purpose cards.

SUMMARY OF THE INVENTION

It is an object of the present invention to provide a card connector which has at least two card-accommodating slots, one designed to accommodate a thin card and the other designed to accommodate a thick card, wherein the card connector has a simple construction and is not bulky, and wherein the insertion of thin cards into the interior of the card-accommodating slot that accommodates a thick card can be prevented.

In order to achieve this object and others, a card connector in accordance with the present invention includes at least two card-accommodating slots, one designed to accommodate thin cards and another designed to accommodate thick cards, and a thin card insertion-preventing device which has a cam surface for the thick cards and a groove that can accommodate the thin cards. The thin card insertion-preventing device is pivotally supported on a shaft so that the insertion-preventing device can pivot on a card guiding arm defining the card-accommodating slot that accommodates the thick cards.

In one embodiment, an inclined guide surface is arranged on the groove to guide the accommodation of the thin cards.

BRIEF DESCRIPTION OF THE DRAWINGS

The invention will now be described by way of example with reference to the accompanying figures of which.

DETAILED DESCRIPTION OF THE PREFERRED EMBODIMENTS

Figure 1:
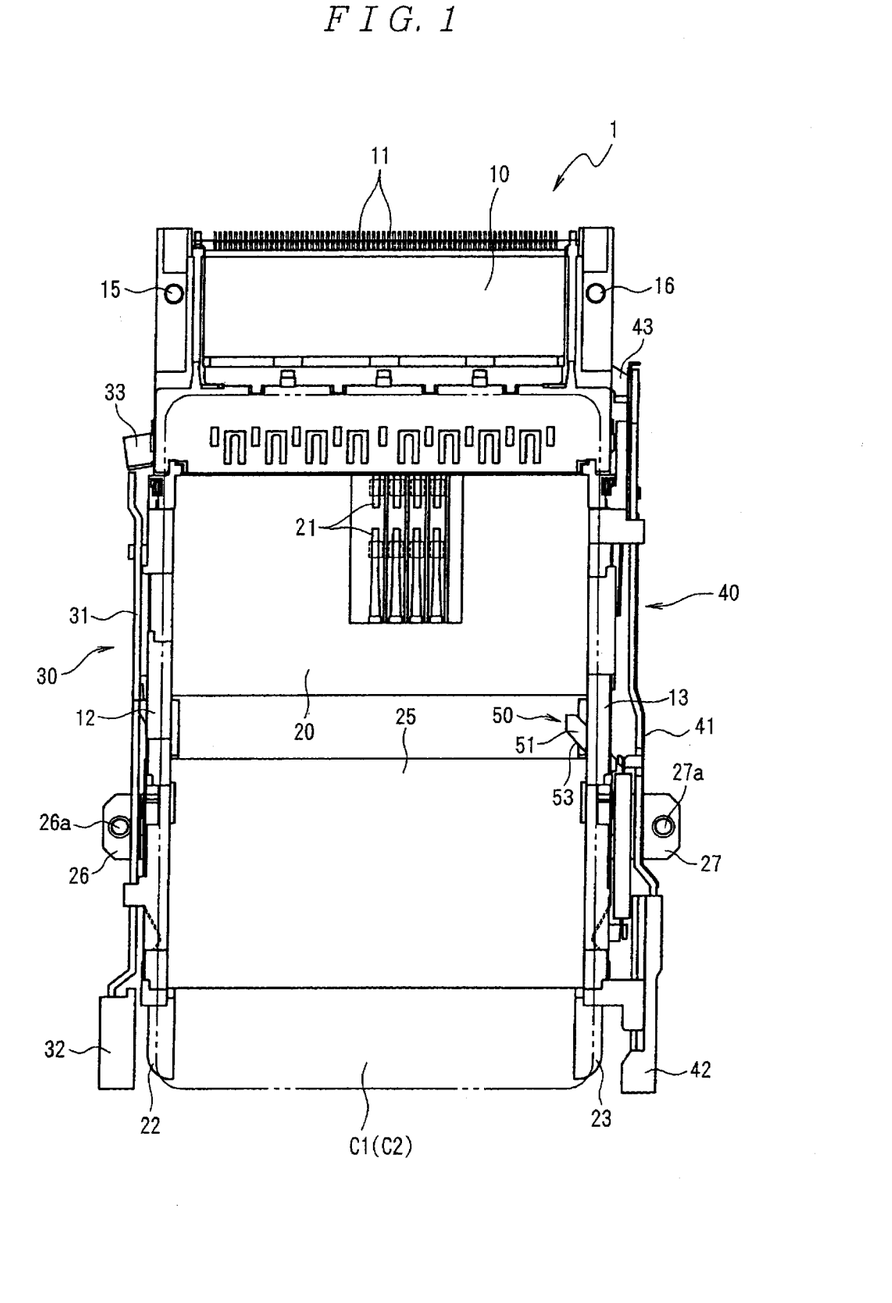
FIG. 1 is a plan view of an embodiment of the card connector in accordance with the present invention.
Figure 2:
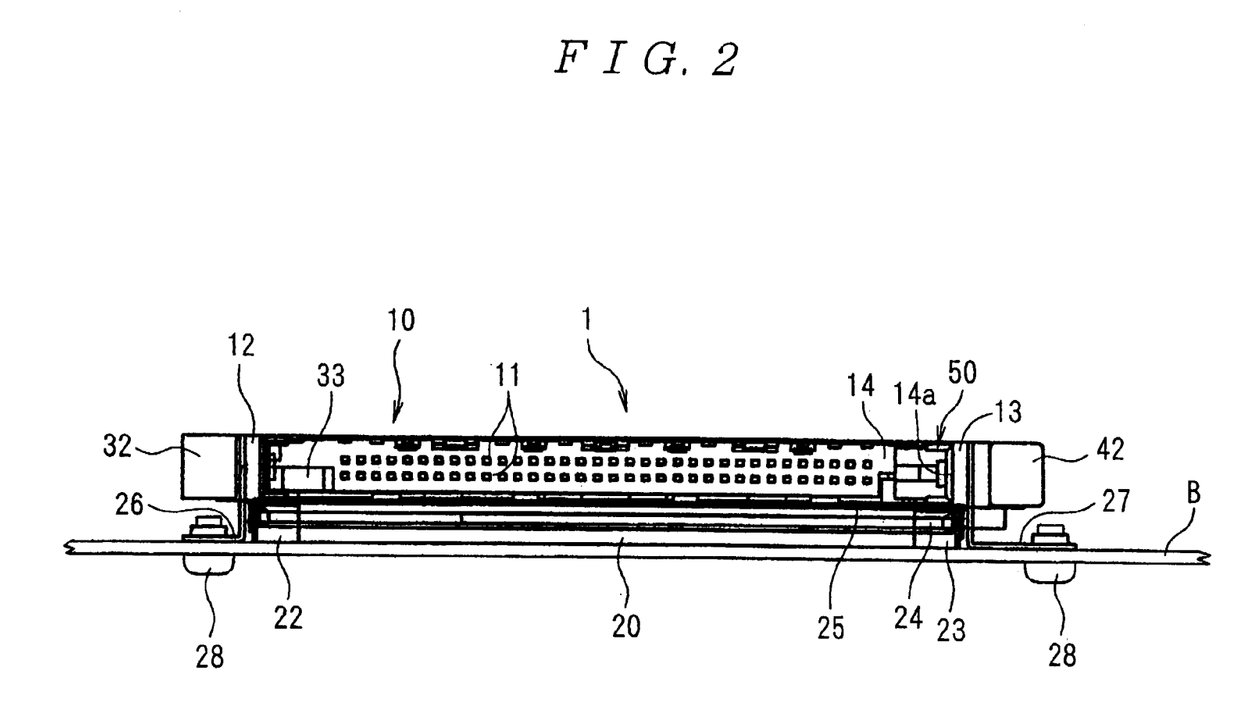
FIG. 2 is a front view of the card connector shown in FIG. 1.
Figure 3:
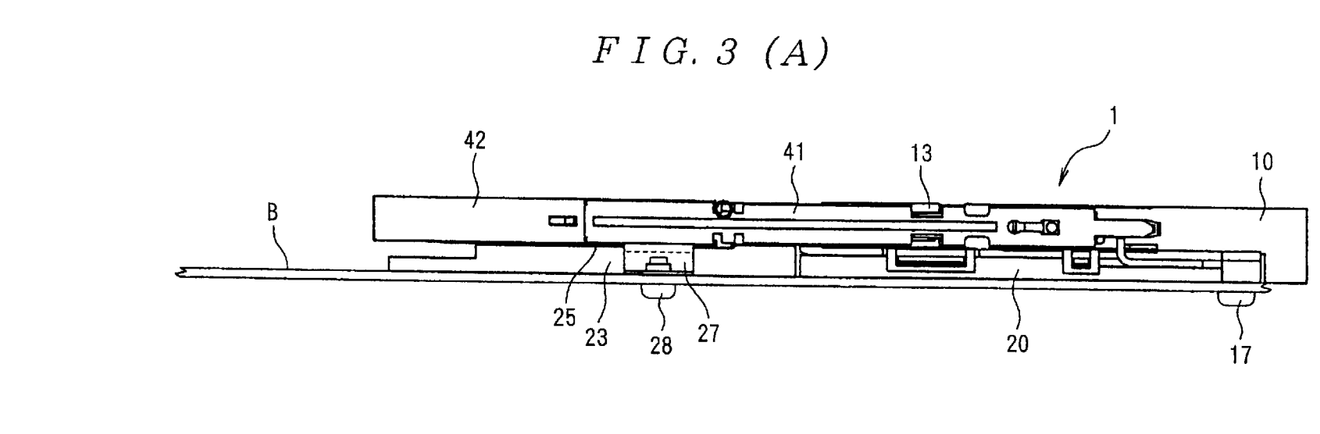
FIG. 3(A) is a right-side view of the card connector shown in FIG. 1.
FIG. 3(B) is a left-side view of the card connector shown in FIG. 1.

Referring first to FIGS. 1–3, the card connector in accordance with the present invention is designated generally as 1 and comprises an IC card connector portion 10 which accommodates a PCMCIA standard thick IC card C1, and a smart card connector portion 20 which accommodates an ISO standard thin smart card C2. The IC card connector portion 10 is arranged vertically adjacent to the smart card connector portion 20.

A plurality of pin contacts 11 are arranged in the IC card connector portion 10 in two rows (upper and lower) lengthwise (i.e., the left-right direction in FIGS. 1 and 2). The pin contacts 11 are designed to mate with a connector of an IC card C1 (i.e., connector 111 as shown in FIG. 7) when the IC card C1 is engaged with the card connector portion 10. A pair of through-holes 15 and 16 are formed in both end portions of the IC card connector portion 10 and attachment screws 17 are inserted through the holes 15,16 to fasten the card connector portion 10 to a circuit board B.

Figure 6:
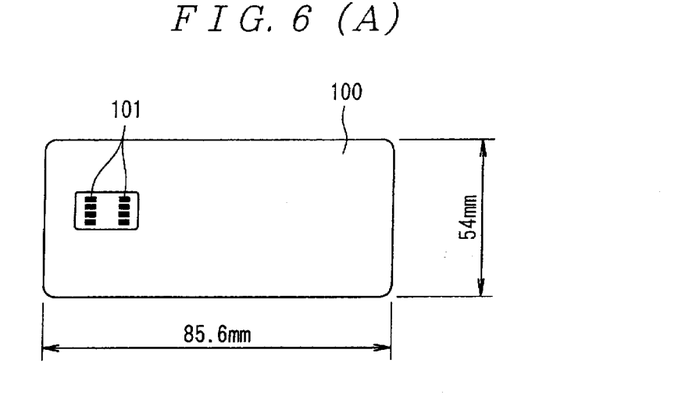
FIG. 6(A) is a top view of an ISO standard smart card.
FIG. 6(B) is a side view of an ISO standard smart card.

A plurality of pairs of plate spring contacts 21 are arranged in the smart card connector portion 20 and are contacted by terminal parts formed on the undersurface of the smart card C2 (the terminal parts 101 shown in FIG. 6) when the smart card C2 is engaged with the card connector portion 20.

A pair of card-guiding arms 12 and 13 are arranged on the end portions of the IC card connector portion 10. As shown most clearly in FIG. 2, each card-guiding arm 12, 13 is formed with a substantially C-shaped cross section, and a card-accommodating slot 14 that accommodates the IC card C1 is formed between the card-guiding arms 12, 13.

The smart card connector portion 20 is arranged on the inside with respect to the card insertion direction (the upper side in FIG. 1) on the undersides of the card guiding arms 12 and 13. A pair of guide rails 22 and 23 are arranged on the card insertion side on the respective undersides of the card guiding arms 12 and 13 and guide the insertion of the smart card C2. A metal plate 25 is arranged between the card guiding arms 12 and 13 and the guide rails 22 and 23 and forms a bridge between the two guiding arms 12 and 13. The card guiding arms 12 and 13 and guide rails 22 and 23 are joined by pawls (not shown) formed on both ends of the metal plate 25. Brackets 26 and 27 are attached to the card guiding arms 12 and 13 in contact with the metal plate 25 and have screw holes 26a and 27a. Attachment screws 28 are screwed into the screw holes 26a and 27a to fasten the guide rails 22 and 23 to the circuit board B. A card-accommodating slot 24 for accommodating the smart card C2 is formed between the guide rails 22 and 23.

An eject mechanism 30 for ejecting the IC card C1 that has been inserted into the IC card connector portion 10 is arranged on the outside wall surface of the guiding arms 12. The eject mechanism 30 comprises a push bar 31 movable in the directions of card insertion and ejection along the outside wall surface of the guiding arm 12, a push-button 32 attached to the card insertion end of the push bar 31, and an eject bar 33 arranged on the opposite end of the push bar 31 from the card insertion end. The eject bar 33 is constructed such that when one end is pushed by the tip end of the push bar 31, the other end of the eject bar 33 ejects the IC card C1.

An eject mechanism 40 for ejecting the smart card C2 that has been inserted into the smart card connector portion 20 is arranged on the outside wall surface of guiding arm 13. Eject mechanism 40 comprises a push bar 41 movable in the directions of card insertion and ejection along the outside wall surface of the guiding arm 13, a push-button 42 attached to the card insertion end of the push bar 41, and an eject bar 43 arranged on the opposite end of the push bar 41 from the card insertion end. The eject bar 43 is constructed such that when one end is pushed by the tip end of the push bar 41, the other end of the eject bar 43 ejects the smart card C2.

A thin card insertion-preventing device 50 is arranged to prevent the insertion of a thin smart card C2 into the card-accommodating slot 14. The thin card insertion-preventing device 50 is pivotally supported by a shaft 56 on the card guiding arm 13 so that it is free to pivot in a card guide 14a of the card-accommodating slot 14 that accommodates the IC card C1. The card guide 14a is arranged at an approximate central, longitudinal portion of the guiding arm 13.

The thin card insertion-preventing device 50 will be described in detail with reference to FIGS. 4(A), 4(B), 4(C), 5(A) and 5(B).

Figure 5:
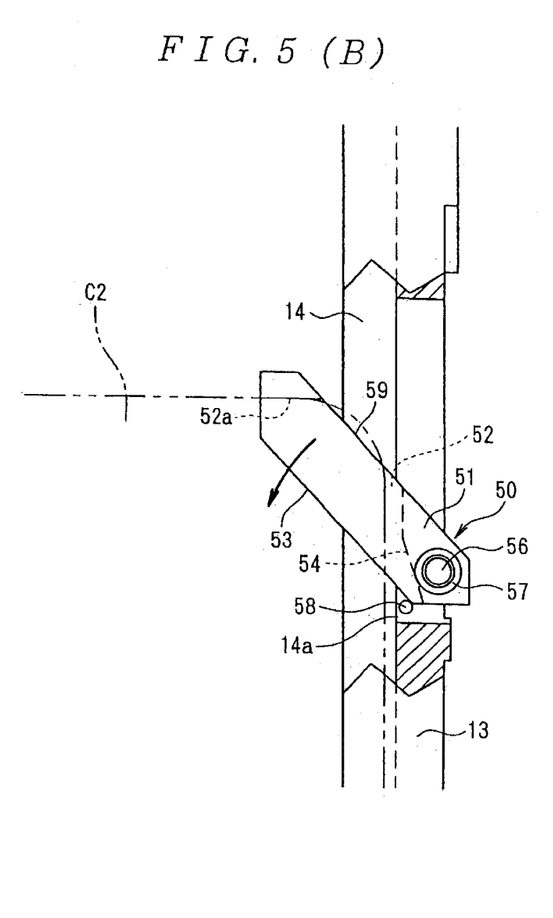
FIG. 5(A) is a partial sectional top view showing the operating state of the thin card insertion-preventing device when a thick IC card is inserted.
FIG. 5(B) is a partial sectional top view showing the operating state of the thin card insertion-preventing device when a thin smart card is inserted.

As shown in FIGS. 5(A) and 5(B), the thin card insertion-preventing device 50 includes a card insertion preventing device main body 51, a pivoting shaft 56 which supports the main body 51 so that the main body 51 is pivotable into the card-accommodating slot 14, a torsion spring 57 wound around the circumference of the pivoting shaft 56), and a stopper 58 which regulates the pivoting range of the main body 51 (i.e., the pivotal movement of the main body 51 into the card-accommodating slot 14). The torsion spring 57 drives the main body 51 so that the main body 51 is caused to pivot toward the inside (i.e., in the direction indicated by the arrows in FIGS. 5(A) and 5(B)). The direction of pivoting of the main body 51 is oriented along the main surfaces of the card that is inserted.

Figure 4:
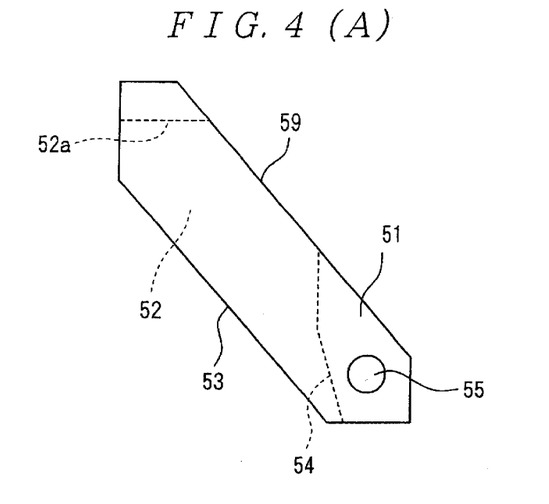
FIG. 4(A) is a top view of the main body of the thin card insertion-preventing device in the card connector shown in FIG. 1.
FIG. 4(B) is a front view of the main body of the thin card insertion-preventing device.
FIG. 4(C) is a left-side view of the main body of the thin card insertion-preventing device.

As shown in FIG. 4(A), the main body 51 of the thin card insertion-preventing device 50 is formed by a plate member having a groove 52 extending through the plate member from the inside to the outside in a central portion (with respect to the vertical direction). The plate member 51 may be formed by molding an insulative material such as a synthetic resin. The groove 52 has a vertical height that allows the accommodation of only a thin smart card C2, and not a thicker card such as an IC card C1. The inside surface of the plate member 51 is used as a cam surface 53 for the thick IC card C1, and the outside surface 59 of the plate member 51 is substantially parallel to the cam surface 53. An inclined guide surface 54 is formed in the groove 52 and guides the accommodation of the thin smart card C2. A shaft hole 55 is formed through the main body 51 in the vertical direction and the pivoting shaft 56 passes through the shaft hole 55.

The operation of the thin card insertion-preventing device 50 will now be described with reference to FIGS. 1, 5(A) and 5(B).

Initially, when the card connector 1 is mounted on the circuit board B, and no card of any type is accommodated by the card connector 1, the main body 51 of the thin card insertion-preventing device 50 is pivoted toward the inside as shown in FIG. 1, so that the cam surface 53 is inclined with respect to the insertion direction and the inside end surface 52a of the groove 52 is substantially perpendicular to the insertion direction. In this condition, the main body 51 is urged by the torsion spring 57 to pivot inward into the card-accommodating slot 14. However, the end portion of the cam surface 53 on the side of the pivoting shaft 56 contacts the stopper 58 to thereby limit the pivoting range. Since the inside end surface 52a prevents the insertion of a smart card C2, this surface may be a surface that rises toward the right instead of being perpendicular to the insertion direction in FIG. 5(B).

When a thick IC card C1 is inserted into the card-accommodating slot 14 between the card guiding arms 12 and 13, the tip end of the IC card C1 contacts the cam surface 53 of the main body 51 as shown in FIG. 5(A), so that the main body 51 pivots toward the outside as the insertion progresses. The state of contact between the side surface of the IC card C1 and the cam surface 53 is maintained by the spring force of the torsion spring 57. Since the outside surface 59 of the main body 51 is substantially parallel to the cam surface 53, the amount of protrusion of the main body 51 from the guiding arm 13 can be reduced in a state in which the main body 51 has pivoted toward the outside, so that collision with the push bar 41 arranged on the outside wall surface of the guiding arm 13 can be avoided.

When the IC card C1 is inserted even further, the IC card C1 engages with the IC card connector portion 10 so that the connector portion of the IC card C1 and the pin contacts 11 of the IC card connector portion 10 are electrically connected.

On the other hand, when a thin smart card C2 is inserted into the card-accommodating slot 14 between the card guiding arms 12 and 13 when the card connector 1 is mounted on the circuit board B, the tip end portion of the smart card C2 is accommodated in the groove 52 of the main body 51 of the card insertion-preventing device 50, and the tip end surface of the smart card C2 contacts the inside end surface 52a of the groove 52, as shown in FIG. 5(B). In this case, even if the insertion of the smart card C2 is performed without stabilization in the vertical direction inside the card-accommodating slot 14, the tip end portion of the smart card C2 is guided along the inclined guide surface 54 and is guided into the groove 52. Since the tip end surface of the smart card C2 contacts the inside end surface 52a of the groove 52, the insertion of the smart card C2 is prevented by the main body 51. Accordingly, the complete insertion of a thin smart card C2 into the interior of the card-accommodating slot 14 that accommodates thick IC cards C1 is prevented.

Thus, in accordance with one, non-limiting embodiment of the invention described above, a thin card insertion-preventing device 50 that allows the insertion of thick IC cards C1 and prevents the insertion of thin smart cards C2 is constructed from a main body 51, a pivoting shaft 56, a torsion spring 57 wound around the circumference of the pivoting shaft 56 and a stopper 58 that restricts the pivoting range of the main body 51. Accordingly, the mechanism that prevents the insertion of thin cards can be constructed using a simple construction that has a low height, and the card connector 1 can be manufactured inexpensively. Furthermore, there is no need to form cut-outs, etc., in the IC card C1 or smart card C2, so that the present invention can be applied to general all-purpose cards.

When a thin smart card C2 is inserted into the card-accommodating slot 24 between the guide rails 22 and 23 in a state in which the card connector 1 is mounted on the circuit board B, the smart card C2 is accommodated in the smart card connector portion 20 so that the terminal parts formed on the undersurface of the smart card C2 contact the plurality of pairs of plate spring contacts 21, and are electrically connected to these plate spring contacts 21.

An embodiment of the present invention has been described above. However, the present invention is not limited to this embodiment; various alterations may be made.

For example, as described above, the thin card insertion-preventing device 50 is arranged on the side of the guiding arm 13. However, it would also be possible to arrange the thin card insertion-preventing device on the side of the opposite guiding arm 12, or to arrange such devices on both guiding arms 12 and 13.

Furthermore, the spring that drives the main body 51 of the thin card insertion-preventing device 50 toward the inside may be a plate spring or coil spring, etc., instead of a torsion spring as described above. Moreover, the stopper 58 may be arranged in a position that contacts a surface other than the cam surface 53.

The cards used may be cards other than PCMCIA standard IC cards C1 or ISO standard smart cards C2.

It would also be possible to arrange the card-accommodating slot 14 that accommodates thick IC cards C1 on the lower side, and to arrange the card-accommodating slot 24 that accommodates thin smart cards C2 on the upper side, i.e., the card-accommodating slot 24 above the card-accommodating slot 14. The number of card-accommodating slots is not limited to two slots and thus, the card connector in accordance with the invention may have three or more card-accommodating slots.

In sum, as described above, a card connector in accordance with the invention includes a thin card insertion-preventing device includes a member having a cam surface for guiding the accommodating of thick cards and a groove for guiding the accommodation of thin cards. The member is pivotally supported by a shaft so that it can pivot on a card guiding arm defining a card-accommodating slot that accommodates the thick cards. Accordingly, in a card connector which has at least two card-accommodating slots that respectively accommodate thin cards and thick cards, the insertion of thin cards into the deep interior of the card-accommodating slot that accommodates the thick cards can be prevented by means of a simple construction that has a low height.

Furthermore, in one embodiment of the card connector in accordance with the present invention, an inclined guide surface is arranged in the groove to guide the accommodation of the thin cards. Accordingly, even if the insertion of a thin card is performed without stabilization inside the card-accommodating slot, the thin card is guided along the inclined guide surface and securely guided into the groove.

The foregoing illustrates some of the possibilities for practicing the invention. Many other embodiments are possible within the scope and spirit of the invention. It is, therefore, intended that the foregoing description be regarded as illustrative rather than limiting, and that the scope of the invention is given by the appended claims together with their full range of equivalents.

What is claimed is:

1. A card connector defining at least a first card-accommodating slot adapted to accommodate a thin card and a second card-accommodating slot adapted to accommodate a thick card, comprising:

a thin card insertion-preventing device arranged to prevent invention of a thin card into the second card-accommodating slot, said insertion-preventing device comprising a member having a cam surface adapted to be contacted by a thick card upon insertion into the second card-accommodating slot and a groove adapted to accommodate a thin card upon insertion into the second card-accommodating slot, said member being pivotally mounted to the card connector such that said member is pivotable into the second card-accommodating slot.

2. The card connector of claim 1, wherein said member includes an inclined surface defining a part of said groove, said inclined surface being adapted to guide a thin card upon insertion into the second card-accommodating slot.

3. The card connector of claim 1, further comprising biasing means for biasing said member to pivot into the second card-accommodating slot.

4. The card connector of claim 3, wherein said biasing means comprise a spring.

5. The card connector of claim 1, wherein said thin card insertion-preventing device further comprises a shaft, said member being pivotally mounted by said shaft to the card connector.

6. The card connector of claim 5, further comprising a torsion spring wound around said shaft for biasing said member to pivot into the second card-accommodating slot.

7. The card connector of claim 5, wherein said member includes a shaft hole, said shaft extending through said shaft hole.

8. The card connector of claim 1, further comprising a card guiding arm defining the second card-accommodating slot, said member being pivotally mounted to said card guiding arm.

9. The card connector of claim 1, wherein said member includes an inside end surface defining a part of said groove and adapted to be contacted by a thin card upon insertion into the second card-accommodating slot.

10. The card connector of claim 1, further comprising limiting means for limiting the pivotal movement of said member into the second card-accommodating slot.

11. The card connector of claim 10, further comprising a card guiding arm defining the second card-accommodating slot, said limiting means comprising a stopper arranged on said card guiding arm.

12. The card connector of claim 1, wherein said member is a plate member.

13. The card connector of claim 1, further comprising mounting means for pivotally mounting said member to the card connector such that said member is pivotable into the second card-accommodating slot.

14. The card connector of claim 13, wherein said mounting means comprise a shaft coupled to said member.

15. The card connector of claim 14, wherein said mounting means further comprise a torsion spring wound around said shaft for biasing said member to pivot into the second card-accommodating slot.

16. The card connector of claim 13, further comprising a card guiding arm defining the second card-accommodating slot, said mounting means pivotally mounting said member to said card guiding arm.

17. A card connector, comprising
    means defining a first card-accommodating slot adapted to accommodate a thin smart card;
    means defining a second card-accommodating slot adapted to accommodate a thick IC card; and
    a thin card insertion-preventing device arranged to prevent invention of a thin card into said second card-accommodating slot,
    said insertion-preventing device comprising a member having a cam surface adapted to be contacted by a thick card upon insertion of the thick card into said second card-accommodating slot and a groove adapted to accommodate a thin card upon insertion of the thin card into said second card-accommodating slot, said member being pivotally mounted on said means defining said second card-accommodating slot such that said member is pivotable into said second card-accommodating slot.

18. The card connector of claim 17, wherein said insertion-preventing device further comprises a shaft connected to said means defining said second card-accommodating slot, said member being pivotally mounted by said shaft to said means defining said second card-accommodating slot.

19. The card connector of claim 18, further comprising a torsion spring wound around said shaft for biasing said member to pivot into the second card-accommodating slot.

20. The card connector of claim 17, wherein said member includes an inclined surface defining a part of said groove, said inclined surface being adapted to guide the thin card upon insertion of the thin card into said second card-accommodating slot.

21. The card connector of claim 17, further comprising biasing means for biasing said member to pivot into said second card-accommodating slot.

22. The card connector of claim 17, wherein said means defining said second card-accommodating slot include a card guiding arm arranged on one side of said second card-accommodating slot, said member being pivotally mounted to said card guiding arm.

23. The card connector of claim 17, wherein said means defining said first card-accommodating slot are arranged vertically adjacent said means defining said second card-accommodating slot.

\* \* \* \* \*

UNITED STATES PATENT AND TRADEMARK OFFICE
CERTIFICATE OF CORRECTION

PATENT NO. : 6,726,508 B2 Page 1 of 1
DATED : April 27, 2004
INVENTOR(S) : Watanabe et al.

It is certified that error appears in the above-identified patent and that said Letters Patent is hereby corrected as shown below:

Column 8,
Line 38, "to prevent invention of a thin card," should read -- to prevent insertion of a thin card --.

Column 9,
Line 37, "to prevent invention of a thin card," should read -- to prevent insertion of a thin card --.

Signed and Sealed this

Twenty-seventh Day of September, 2005

JON W. DUDAS
*Director of the United States Patent and Trademark Office*